M. Fitzgibbons.
Bureau Drawer.
No. 3,715.
Fig: 2. Reissued Nov. 9, 1869.
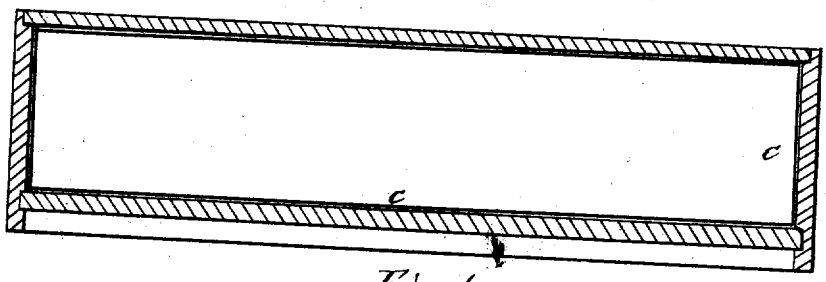
Fig: 1
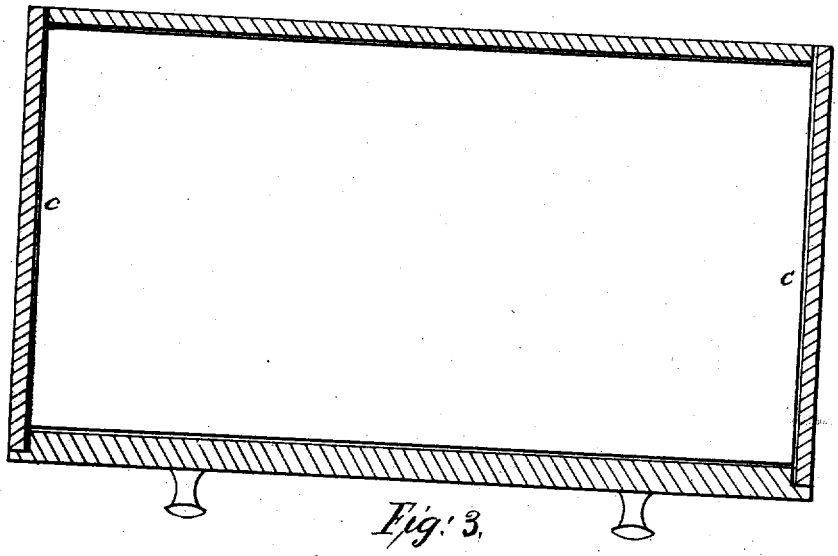
Fig: 3.
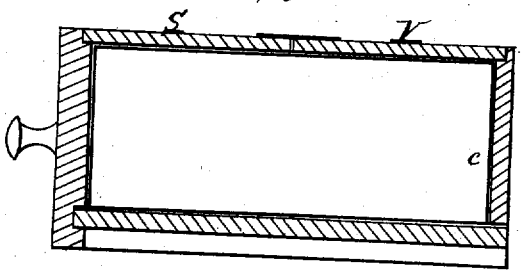
Witnesses;
H. Smith
A. S. Hughman
Inventor;
M. Fitzgibbons
Chapman Hosmer & Co
Attys.
N. PETERS, PHOTO-LITHOGRAPHER, WASHINGTON, D. C.

United States Patent Office.

MAURICE FITZGIBBONS, OF NEW YORK, N. Y., FOR HIMSELF, AND R. S. JENNINGS, ASSIGNEE OF MAURICE FITZGIBBONS.

*Letters Patent No.* 94,096, *dated August* 24, 1869; *reissue No.* 3,715, *dated November* 9, 1869.

IMPROVED DRAWER OR TRAY.

The Schedule referred to in these Letters Patent and making part of the same.

*To all whom it may concern:*

Be it known that I, MAURICE FITZGIBBONS, of New York, in the county of New York, and State of New York, have invented a new and valuable Improvement in Bureau-Drawers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal section of my drawer;

Figure 2 is a vertical section; and

Figure 3 is a cross-section of the same.

My invention relates to drawers for bureaus; and

It consists in lining the same with Spanish-cedar veneering, to keep away moths, and also in providing means for rendering the same air-tight, at the will of the operator.

I construct my drawer in the usual manner, of wood, and line it throughout with Spanish-cedar veneering, cut with the grain of the timber, in the same manner as the veneering is prepared that is used as a substitute for wall-paper—usually not more than one hundredth of an inch in thickness.

This cedar lining is shown on the drawing, and is marked *c*.

I next construct a cover for the drawer, marked *v* on the drawings, extending from the rear to a point about half way from the front, and fit the same so closely that no air can find access through the joints. I then construct a lid, and hinge it to the part last mentioned, and adjust the same in such manner that it shall fit closely within the front side of the drawer, at its top, as shown at *s*.

Finally, I prepare strips of gummed cloth or paper, of suitable length and width to cover and enclose the rim of the lid, and, uniting the same to the top of the drawer, render the entire drawer air-tight.

The gummed strips of cloth or paper are intended for use only when the furs or other garments liable to be attacked by moths are to be stored away for the summer. When such clothing is in daily or occasional use, the odor of the cedar furnishes sufficient protection against troublesome insects.

Not only does this cedar lining protect the garments stored in the drawer against moths, but it also serves to give an odor to such garments that is wholesome and agreeable.

In trunks, arranged with slats for holding trays, this drawer is well adapted for use. By constructing it of the suitable size and shape, it becomes a tray for trunks of great value, giving to its contents the same security against moths, and the same agreeable odor, as when it is used for bureaus.

I claim the drawer or tray herein specified, lined with cedar, and having a cover, *v*, lid *s*, and gummed strips, as described, when constructed and arranged as and for the purposes specified.

M. FITZGIBBONS.

Witnesses:
J. B. NONES,
JAMES TAYLOR.